United States Patent [19]
Burke et al.

[11] Patent Number: 5,505,884
[45] Date of Patent: Apr. 9, 1996

[54] CONTACT LENSES AND MATERIALS AND METHODS OF MAKING SAME

[75] Inventors: William J. Burke; Lisa A. Folk, both of Tempe; Donald J. Ratkowski, Mesa, all of Ariz.

[73] Assignee: Pilkington Barnes Hind Inc., Sunnyvale, Calif.

[21] Appl. No.: 440,712

[22] Filed: May 15, 1995

Related U.S. Application Data

[62] Division of Ser. No. 139,460, Oct. 20, 1993, abandoned, which is a continuation of Ser. No. 758,786, Sep. 12, 1991, abandoned, which is a continuation of Ser. No. 200,744, May 31, 1988, abandoned.

[51] Int. Cl.$^6$ .......................... B29D 11/00; C08F 220/20
[52] U.S. Cl. .......................... 264/1.1; 351/177; 523/106; 523/107; 525/309; 525/903; 526/323.2; 526/245; 526/279; 264/2.7
[58] Field of Search .................................... 523/106, 107; 526/323.2, 245, 279; 351/177; 525/309, 903; 264/1.1, 2.7

[56] References Cited

U.S. PATENT DOCUMENTS

| | | | |
|---|---|---|---|
| 3,961,379 | 6/1976 | Highgate | 351/160 R |
| 3,978,164 | 8/1976 | LeBoeuf et al. | 351/160 R |
| 4,139,513 | 2/1979 | Tanaka et al. | 351/160 R |
| 4,208,362 | 6/1980 | Deichert | 351/160 H |
| 4,303,772 | 12/1981 | Novicky | 351/160 H |
| 4,347,198 | 8/1982 | Ohkada | 264/2.3 |
| 4,419,505 | 12/1983 | Ratkowski | 526/279 |
| 4,433,111 | 2/1984 | Tighe et al. | 525/326.2 |
| 4,536,554 | 8/1985 | Lim | 526/264 |
| 4,540,761 | 9/1985 | Kawamura | 526/245 |
| 4,661,573 | 4/1987 | Ratkowski et al. | 526/245 |
| 4,814,402 | 3/1989 | Nakashima et al. | 526/245 |
| 4,829,126 | 5/1989 | Nakajima et al. | 525/283 |
| 4,863,977 | 9/1989 | Tateosian et al. | 525/903 |
| 4,904,421 | 2/1990 | Ando et al. | 264/2.6 |
| 5,087,392 | 2/1992 | Burke et al. | 264/2.7 |
| 5,196,493 | 3/1993 | Gruber et al. | 526/245 |

FOREIGN PATENT DOCUMENTS

| | | |
|---|---|---|
| 0129840 | 1/1985 | European Pat. Off. |
| 0154270 | 9/1985 | European Pat. Off. |
| 0242080 | 10/1987 | European Pat. Off. |
| 63-13721 | 1/1988 | Japan. |
| 1138527 | 5/1989 | Japan. |
| 1404378 | 8/1975 | United Kingdom. |
| 1480880 | 4/1977 | United Kingdom. |
| 2190089 | 11/1987 | United Kingdom. |

OTHER PUBLICATIONS

Legge et al., *Thermoplastic Elastomers*, Hansen Publications, pp. 49–50.
Sperling, *Introduction to Physical Polymer Science*, J. Wiley & Sons (1986), pp. 346–349.

*Primary Examiner*—Paul R. Michl
*Assistant Examiner*—Andrew E. C. Merriam
*Attorney, Agent, or Firm*—Burns, Doane, Swecker & Mathis

[57] ABSTRACT

An interpenetrating network copolymer, method of producing same, and method of producing optical lens blanks and finished lenses therefrom. The method broadly involves the preparation of first and second mixtures of polymerizable vinyl monomers and interrupting the polymerization of the first mixture at a relative viscosity of from about 1.05 to about 10 by admixing the partially polymerized first mixture with the second mixture to create a casting solution and thereafter, when desired, polymerizing molded casting solution in heat to create a solid lens material.

21 Claims, No Drawings

CONTACT LENSES AND MATERIALS AND METHODS OF MAKING SAME

This application is a divisional, of application Ser. No. 08/139,460, filed Oct. 20, 1993, now abandoned, which, in turn, is a continuation of U.S. Ser. No. 07/758,786 filed on Sep. 12, 1991, now abandoned, which, in turn, is a continuation of U.S. Ser. No. 07/200,744 May 31, 1988, now abandoned.

The present invention relates to new interpenetrating network copolymer compositions, a novel multistage copolymerization process for the preparation of such compositions, and the formation of shaped objects from such compositions by applying a unique cast molding procedure thereto.

More particularly, the present invention relates to optically clear, oxygen permeable contact lens blanks having at least one finished lens surface, said blanks being prepared directly from a partially crosslinked vinyl copolymer composition by a controlled cast molding procedure.

The resulting finished contact or intraocular lenses, prepared either directly or by lathe cutting the one unfinished side of the lens blank produced hereby, have the clarity, dimensional stability, oxygen permeability, wettability, optics and durability desired for either daily or extended wear contact lenses or intraocular lenses.

BACKGROUND OF THE INVENTION

The published literature on contact lenses has been extensive since the disclosure of the use of organic plastics for this purpose by Toughy in U.S. Pat. No. 2,510,438. The standard contact lens used almost exclusively for many years was made from poly(methylmethacrylate) (PMMA). PMMA can be readily injection molded, compression molded, or cast molded to give inexpensive, highly transparent, stable, hard, wettable contact lenses. However, as a result of the very low oxygen permeability of PMMA, lenses made therefrom have to be removed from the eye at least once daily.

In order to overcome the deficiency of the PMMA lenses, numerous other organic polymers have been proposed for use as contact lenses. Cellulose acetate butyrate lenses, for example, have a somewhat higher oxygen permeability than PMMA and are readily fabricated by injection molding but have a lower dimensional stability than PMMA.

Soft contact lenses based upon crosslinked polymers from hydrophilic monomers, such as 2-hydroxyethyl methacrylate or N-vinyl-2-pyrrolidone, are found to be generally more comfortable to wear than PMMA lenses but are more fragile and have a tendency to become cloudy because of the ease by which proteinaceous material and other contaminants are deposited thereon. Soft lenses prepared from silicone rubber have a very high oxygen permeability but poor mechanical properties and are resistant to wetting.

Compared with PMMA contact lenses, lenses prepared from copolymers of a silicone methacrylate with methyl methacrylate (Gaylord; U.S. Pat. No. 4,120,570) or with methyl itaconate (Ellis; U.S. Pat. No. 4,424,328) have significantly greater but still limited oxygen permeability. Considerably higher oxygen permeabilities for contact lenses from crosslinked methyl methacrylate, fluoro substituted methacrylates and siloxane methacrylate copolymers have been reported by Ratkowski and Burke (U.S. Pat. No. 4,661,573). Conventional lathe cutting techniques are used to convert the silicone methacrylate type copolymers to hard contact lenses. An extensive summary of related contact lens art is given by Keogh (U.S. Pat. No. 4,259,467).

Although the crosslinked, highly oxygen permeable hard contact lenses now available represent a considerable advance over the prior art, the fabrication of these lenses requires an expensive, delicate and time consuming lathing operation in order to obtain good optical properties.

Wichterle (U.S. Pat. No. 3,408,429) describes a complex centrifugal casting technique for converting a mixture of hydroxyethyl methacrylate and ethylene glycol dimethacrylate into a crosslinked polymer lens which, upon being subjected to normal saline, is converted into a soft contact lens. This complex procedure inherently yields products having optics that are inferior to those of hard contact lenses.

Considerable attention has been given to the modification of polymer properties through the use of procedures involving the formation of an interpenetrating polymer network (IPN). An IPN can be defined broadly as an intimate network of two or more polymers at least one of which is either synthesized and/or crosslinked in the presence of the other(s).

LiU, for example, in U.S. Pat. No. 4,618,644 describes the polymerization of methyl methacrylate in the presence of a silicone polymer to obtain a product of improved toughness. The polymerization of hydroxyethyl methacrylate in the presence of ethylene glycol dimethacrylate and a crosslinkable poly(dimethylsiloxane) to yield a product stated to be useful for the fabrication of contact lenses is described by Falcetta (Ger. Offen. D.E.2,518,904). Contact lenses have also been fabricated from the interpenetrating network polymer resulting from the polymerization of 2-hydroxyethyl methacrylate in the presence of poly-N-vinylpyrrolidone (Ewell, U.S. Pat. No. 3,647,736).

Neefe (U.S. Pat. No. 4,632,773) shows the polymerization of methyl methacrylate in the presence of a syrup containing polymerized methacryloxypropyltrimethoxysilane and a fluorescent colored pigment to obtain a solid contact lens blank material which can be readily identified. Tighe and Gee (U.S. Pat. No. 4,430,458) disclose the formation of a soft contact lens material by the crosslinking of a polymeric hydrogel of a copolymer of N-vinyl-2-pyrrolidone during the final compression or injection molding process. Lim et al (U.S. Pat. No. 4,536,554) describes the preparation of soft contact lenses made from the interpenetrating network polymer obtained by the polymerization of a mixture containing a hydrophilic and a hydrophobic monomer and at least two crosslinking agents. A comprehensive review of interpenetrating polymer networks and their applications is provided in the book on *Interpenetrating Polymer Networks and Related Materials* by L. H. Sperling: Plenum Press; New York and London; 1981.

As noted above, considerable progress has been made in polymer synthesis and fabrication since PMMA contact lenses were first introduced. The need, however, for a highly oxygen permeable, durable, dimensionally stable, comfortable contact lens which can be readily fabricated by a simple economical procedure is still an unfilled need of the optical industry and it is toward this need that the present invention is directed.

BRIEF SUMMARY OF THE INVENTION

The present invention is based on the discovery of a unique, multistep polymerization process which permits the synthesis of novel polymers which can be readily and economically fabricated into high quality optical lenses such as contact lenses, having all of the desired properties listed above.

Accordingly, a prime object of the present invention is to provide a novel and unique oxygen permeable, high quality contact lens blank having at least one finished lens surface thereon which is produced directly from a vinyl copolymer composition prepared by a novel cast molding procedure.

Another object of the present invention is to provide new and improved copolymer compositions which are especially useful in the manufacture of optical lenses to produce lenses having an outstanding combination of desirable properties not previously achieved.

A further object of the present invention is to provide a novel, unique and relatively simple process for directly converting a vinyl comonomer system into a crosslinked interpenetrating network polymer in the form of an optical lens blank having at least one finished surface.

An additional object of the present invention is to provide new and improved daily and extended wear contact lenses and other close tolerance molded forms directly from vinyl comonomer systems by a novel copolymerization process.

These and still further objects as shall hereinafter appear are readily fulfilled by the present invention in a highly unexpected manner as can be readily discerned from the following detailed description of exemplary embodiments thereof.

DESCRIPTION OF THE PREFERRED EMBODIMENTS

The copolymers of the present invention are obtained by the creation of an inhibited first mixture of selected vinyl comonomers containing a monomeric polymerizable polyvinyl crosslinking agent and a polymerization initiator (herein designated "Mixture A"); subjecting Mixture A to a controlled partial polymerization to a predetermined viscosity (herein designated "partially polymerized Mixture A"); admixing partially polymerized Mixture A with an inhibited second mixture of vinyl monomers and monomeric polymerizable polyvinyl crosslinking agent (herein designated "Mixture B") to create a casting solution, filling a mold with the casting solution created by admixing partially polymerized Mixture A with Mixture B, closing the mold and then heating the closed mold to complete the polymerization. The mold is designed so that one or both surfaces of the blank produced therein is sufficiently finished and suitable with little or no modification, for use as a contact lens and like optical device.

More specifically, this invention involves the partial polymerization of a comonomer Mixture A, containing from about 5% to about 95% (W/W) (by weight of the final formula weight of monomers) and a vinyl polymerization initiator, to a predetermined relative viscosity in the range of from about 1.05 to about 10, to form partially polymerized Mixture A, admixing the partially polymerized Mixture A with from about 5% to about 95% (W/W) (weight percent based on final formula weight) of an inhibited second mixture of vinyl comonomers and a monomeric polymerizable polyvinyl crosslinking agent (Mixture B), to form a casting solution therewith; filling the mold with the casting solution, closing the mold, heating the closed mold to complete the polymerization process, and thereafter removing the resulting shaped polymerized interpenetrating network copolymer from the mold.

In general, stated as a percentage of all comonomers used in preparing the final formulation, Mixture A contains from 0 to about 85% (W/W) of monovinyl hydrophobic monomers such as methyl methacrylate, styrene or an acryloxyalkylpolysiloxane; from 0% to about 90% (W/W) of hydrophilic monomers such as methacrylic acid, N-vinyl-2-pyrrolidone, or 2-hydroxyethyl methacrylate; from about 0.01% to about 25% (W/W) of a polyvinyl crosslinking agent such as a di(acryloxypropyl)polysiloxane or tetraethylene glycol dimethacrylate; and from about 0.01% to about 3% (W/W) of a vinyl polymerization initiator such as Vazo™ 64 (DuPont) or benzoyl peroxide. The mixture of monomers in Mixture B in general will include 0 to about 60% and preferably 0% to about 45% (W/W) of a hydrophobic monomer such as an alkyl methacrylate, from about 0.1% to about 15% of a polymerizable monomeric polyvinyl crosslinking agent such as ethylene glycol diacrylate and from 0% to about 60%, preferably from 0% to about 45% (W/W), of a hydrophilic monomer such as N-vinyl-2-pyrrolidone and, optionally, a vinyl polymerization initiator as will be hereinafter described.

All percentages in this specification are by weight and refer to the percent of monomer in the total weight of all of the comonomers used. In the interest of clarity and brevity, it will be understood that acrylic includes methacrylic and itaconic; acrylate includes methacrylate and itaconate; and acryloxy includes methacryloxy and itaconyloxy.

This invention includes the creation of novel interpenetrating network copolymers prepared by the unique multi-step copolymerization process as will be hereinafter described in detail and the production of optical lenses, such as contact lenses therefrom. The contact lens blanks produced by the present invention have at least one finished lens surface. In cases in which the blank contains a single finished surface, the second surface is readily obtained by standard lens cutting procedures.

The hydrophobic monovinyl monomers suitable for use in the present invention make up from 0 to about 95% (W/W) of the total conomomer weight used and generally include polymerizable unsaturated monovinyl hydrophobic monomers of which the following are considered as representative, namely: methyl methacrylate; styrene; acrylonitrile; 2,2,2-tri-fluoroethyl methacrylate; isopropyl itaconate; methacryloxypropyl-tris(trimethylsiloxy)silane; isobornyl acrylate; diisopropyl fumarate; and methacryloxypropyltrimethoxysilane.

Esters of acrylic acid which are particularly useful in the practice of the present invention in view of their ease of copolymerization and the outstanding properties of the resulting copolymers have the formula:

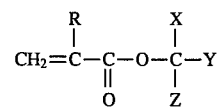

wherein: R is H or a monovalent organic radical having from one to seven carbon atoms; and X, Y, and Z are H, or a monovalent hydrocarbon radical having from one to seven carbon atoms; or a substituted hydrocarbon radical containing one or more —OH, —F, —COOH, —CONR$_2$, —SO$_2$—, —O—,

and —OSiO—, said substituted hydrocarbon radical having not more than 20 carbon atoms.

Monovinyl hydrophilic monomers which can be used in the practice of the present invention make up from about 1% to up to about 98% (W/W) of the total copolymer weight and include as representative, such specific monomers as 2-hydroxyethyl methacrylate; N-vinyl-2-pyrrolidone; methacrylic acid; N-methylmethacrylamide; itaconic acid; glycerol monoitaconate; and N-hydroxyethylacrylamide.

N-vinyl-2-pyrrolidone and related monovinyl polymerizable hydrophilic lactams and hydrophilic hydroxyalkyl mono esters and amide derivatives of acrylic acid having fewer than 15 carbons atoms are particularly useful since they copolymerize readily and add hydrophilic properties to the resulting interpenetrating network polymers prepared according to the multistep process of this invention. The increase in wettability provided by the incorporation of a polymerizable vinyl hydrophilic monomer into the copolymer structure is particularly important when the fabricated product is a hard contact lens. For soft contact lenses, the major portion of the total weight of comonomers will consist of hydrophilic monomers. In general, from 0% to about 12% and preferably from about 1% to about 10% (W/W) of acrylic acid will be used in the total comonomer formulations of hard contact lenses. Preferably, from about 2% up to about 9% (W/W) of methacrylic acid will be used in Mixture A and from 0% to about 5% (W/W) of methacrylic acid will be used in Mixture B for hard contact lens formulations. Minor amounts of acrylic acid may be used optionally in soft contact lens formulations.

Mixture A and Mixture B will contain one or more monomeric polyvinyl crosslinking agents. Suitable crosslinking agents of this type include such representative specific di- and polyacrylates such as ethylene glycol dimethacrylate, tetraethylene glycol dimethacrylate, glycerol triacrylate and 1,3-bis(methacryloxypropyl)-1,1,3,3-tetrakis (trimethylsiloxy)disiloxane; representative polyacrylamides such as N,N'-hexamethylene-bis-acrylamide and N,N'-methylene-bis-methacrylamide; and divinyl hydrocarbons including divinylstyrene and ring substituted vinyl styrenes such as 2-methyl-4-vinylstyrene and 2-methoxy-4-vinyl-styrene.

Free radical polymerization initiators of the type commonly used in polymerizing ethylenically unsaturated compounds are suitable for use in this invention. They include such representative polymerization initiators as benzoyl peroxide; lauroyl peroxide; tertiary butyl peroxypivalate; methyl ethyl ketone peroxide; 2,2'-azobis(isobutyronitrile) (Vazo 64); 1,1-azobis(cyanocyclohexane) (Vazo 88); 2,2'-azobis(2,4-dimethyl valeronitrile ) (Vazo 52 ); and 2,2'-azobis (methylbutyronitrile) (Vazo 67). Vazo type initiators are preferred since they give uniformly good results and do not produce oxygenated residues. Vazo 64 and Vazo 67 are particularly effective for use in this invention. From about 0.1% to about 3% and preferably about 0.2% to about 1.5% (W/W) of initiator is used in Mixture A.

Superior results are obtained when comonomer Mixture A represents from about 30% to about 95% (W/W) and preferably from 50% to 95% (W/W) of the total monomer formula weight. For most systems, best results are obtained when comonomer Mixture A contains from about 75% to about 90% (W/W) and this range is preferred. In terms of the total formula weight, Mixture A will normally contain from 0% to up to about 85% (W/W) of the polymerizable hydrophobic monovinyl monomers, from about 1% up to about 90% (W/W) of the polymerizable hydrophilic monovinyl monomers, and from about 0.01% up to about 25% (W/W) of a long chain polymerizable monomeric polyvinyl monomer, which functions as a crosslinking agent, and from about 0.05% up to about 3% (W/W) of a vinyl polymerization initiator. For the production of hard contact lenses, the monovinyl hydrophobic monomers in Mixture A generally make up from about 30% up to about 85% and preferably from about 60% up to about 85% (W/W) of the total composition. For the production of soft lens, Mixture A will generally contain from about 30% up to about 90% and preferably from 50% up to about 90% (W/W) of monovinyl hydrophilic monomers and from 0% up to about 25% (W/W) of monovinyl hydrophobic monomers of the total monomers used.

For purposes of this application it will be understood that the term short chain crosslinking agent refers to a crosslinking agent in which the terminal vinyl groups are separated by no more than 8 atoms in the chain between the terminal vinyl groups and the term long chain crosslinking agent refers to a crosslinking agent in which the terminal vinyl groups are separated by at least 10 atoms in the chain between the terminal vinyl groups.

Mixture B normally represents from about 5% up to about 70%, preferably from about 5% up to about 50% (W/W) of total monomer formula weight and generally will consist of from 0% up to about 45% (W/W) of polymerizable hydrophobic monomers; from 0% up to about 45% (W/W) of polymerizable hydrophilic monomers; from about 0.1% up to about 25% (W/W) of a monomeric polyvinyl monomer, which functions as a crosslinking agent; a polymerization inhibitor; and from 0 to about 0.3% of a vinyl polymerization initiator. For hard lenses Mixture B contains from about 1% up to about 45%, preferably from about 3% up to about 20% (W/W) of hydrophobic monomer; from 0% up to about 10% (W/W) of hydrophilic monomer; and from about 1.0% up to about 25%, preferably from about 2% to about 15% (W/W) of a polyvinyl monomer, which is a crosslinking agent. For soft lenses, Mixture B contains from 0% up to about 25% (W/W) of hydrophobic monomer; from about 5% up to about 45% (W/W) of hydrophilic monomer and from about 0.05% up to about 12% (W/W) of one or more polymerizable monomeric polyvinyl monomers including from about 0.05 up to about 4% (W/W) of a crosslinking agent having 8 or less atoms in the chain between the vinyl groups and from 0% up to about 10% (W/W) of a crosslinking agent having at least 10 atoms in the chain separating the vinyl groups.

The presence of a vinyl polymerization inhibitor in both Mixture A and Mixture B is required. Generally the commercial vinyl monomers contain from about 10 ppm up to about 500 ppm of a polymerization inhibitor such as hydroquinone or p-methoxyphenol and in addition may contain air, which is also an effective inhibitor. Accordingly, when commercially available inhibited monomers are employed in the practice hereof, no additional inhibitor is normally required, although in those certain instances when closer control of the reaction system is desired additional inhibitor may be added to the system.

In order to achieve the special results desired for the present invention, it is essential to interrupt the polymerization of Mixture A within carefully controlled limits as defined by the relative viscosity of the partially polymerized Mixture A. While the precise relative viscosity will vary somewhat between different comonomer mixtures, it will generally be within the range of from about 1.05 up to about 10 and more particularly in the range of from about 1.15 up to about 7.5. The appropriate acceptable relative viscosity range for a given comonomer system can be readily determined experimentally using known procedures which need not be repeated here.

When the Mixture A has reached the desired relative viscosity herein identified as "partially polymerized Mixture A", the polymerization is stopped by intimately admixing partially polymerized Mixture A with the inhibited Mixture B in the presence of air. Although partially polymerized Mixture A can be added to Mixture B, it is preferable to add Mixture B into partially polymerized Mixture A at this point. A measured amount of the resulting clear, mobile solution of partially polymerized Mixture A and Mixture B is added to a mold, which is then closed. Polymerization of the monomers is then reinitiated and completed by warming the closed mold, preferably in a nitrogen atmosphere to a temperature up to about 80° C., preferably in the range from about 40° C. to about 70° C. for a period of up to 24 hours or more. The heated mold containing the polymerized lens material (herein "lens blank") is then removed from the oven. When the lens blank so formed has only one finished surface, the other surface is readily shaped into the desired configuration by standard lathe cutting procedures.

The total amount of crosslinking monomer used in the practice of the present invention will normally vary from about 0.05% up to about 35% (W/W) and preferably from about 0.1% up to about 25% (W/W) of the total comonomers, depending upon the specific crosslinking monomers employed and the properties desired in the shaped copolymer lens blank. In Mixture A, it is preferable to use crosslinking agents which have the terminal vinyl groups separated by a chain including at least 10 atoms. Particularly good results have been obtained with tetraethyleneglycol dimethacrylate; and 1,3-bis(methacryloxypropyl)-1,1,3,3-tetrakis (trimethylsiloxy)disiloxane and and their use is preferred. The use of such long chain polyvinyl monomers results in longer crosslinks between chains and provides greater latitude in processing conditions used. Particularly good results have been obtained with crosslinkers having two terminal acryloxy groups. Shorter chain crosslinking agents can be used optionally in Mixture A but when used, will in general constitute only a minor amount of the total crosslinking monomers employed.

In Mixture B shorter chain crosslinking agents having the terminal vinyl groups separated by a chain of 8 or less atoms have been found to be effective and can be used either alone or in conjunction with the longer chain crosslinkers of the type described above. Such shorter chain crosslinking agents as ethylene glycol dimethacrylate; propylene glycol diacrylate; and N,N'-methylene-bis-acrylamide are representative monomers of the type leading to shorter crosslinks.

In general, superior results are obtained when appropriate crosslinking agents are present in both Mixture A and Mixture B and this is preferred. For soft lens compositions it is desirable to limit the amount of short chain crosslinking agents in Mixture B to about 0.05% to about 4% and preferably from about 0.1% to about 2% of the total comonomers used.

Suitable hydrophobic monomers for use in this invention include acrylates of the general formula:

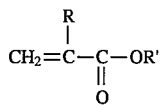

Wherein R=H or a monovalent organic radical having from one to seven carbon atoms; and R' is a hydrocarbon radical having no more than 20 carbon atoms. Such acrylates include methyl methacrylate; cyclohexyl acrylate; isobornyl acrylate; cyclopentadienyl acrylate; isopropyl acrylate; phenyl acrylate; methyl-α-carboxymethyl acrylate and methacryloxypropyl(trimethoxy)silane.

Use of the aforesaid acrylates in the comonomer mixture results in improved surface hardness, increased scratch resistance and greater durability. In those instances where high oxygen permeability of the resulting copolymer is important, the upper limit of such acrylates should not exceed 80% (W/W) of the total comonomer mixture and preferably should be less than 60% (W/W). In general, from 0% to 80% (W/W) and preferably from 0% to 60% (W/W) of such acrylates are used in the copolymer compositions for hard lenses and from 0% to 30% (W/W) in soft lens formulations. Particularly good results are obtained in hard lens compositions when Mixture A contains from about 4% up to about 50% of such acrylates in Mixture A and from 0% up to about 15% of such acrylates in Mixture B. Methyl methacrylate gives particularly good results and is a preferred hydrophobic monomer of the present invention for both hard and soft lenses.

Other hydrophobic monomers suitable for use in this invention include fluoroalkylacrylates having the general formula:

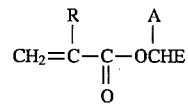

Wherein R is H, or a hydrocarbon monovalent organic radical having from one to seven carbon atoms; A is H or E; and E is a polyfluoroalkyl group having no more than 20 fluorine atoms. The fluoroalkyl acrylates are particularly effective in increasing the resistance to surface deposits on contact lenses.

Suitable fluoroalkyl acrylates for use in this invention include: 2,2,2-trifluoroethyl methacrylate, hexafluoroisopropyl methacrylate; 1,1-dihydroperfluoro-2,2-dimethylpropyl acrylate; 1,1-dihydroperfluorobutyl methacrylate; 1-trifluoromethylethyl acrylate; nonafluorocyclohexyl acrylate; 1,1-dihydroperfluorooctyl methacrylate; 2,2,3,3-tetrafluoropropyl methacrylate; 1,1,-dihydroperfluoropropyl acrylate; 1,1-dihydroperfluorononyl methacrylate; 2(N-ethylperfluorooctanesulfamido)ethyl methacrylate; and 2,2,2-trifluoroethyl-α-carboxymethyl acrylate. Of the above, 2,2,2-trifluoroethyl methacrylate and 1,1-dihydroperfluorobutyl methacrylate are preferred since they provide copolymers with particularly good properties. In general lens production, the fluoroalkyl acrylates will make up less than 50% (W/W) of the total comonomer mixture and usually will constitute less than 35% (W/W). For contact lenses, from 0% up to about 25% (W/W) of the fluoroacrylates is preferred. For hard lens compositions particularly good results are obtained when Mixture A contains from about 5% up to about 25% (W/W) of a fluoroacrylate and Mixture B contains from 0% up to about 10% of a fluoroacrylate.

Oxygen permeability is an important property of contact lenses since the lack of oxygen at the interface between the contact lens and the cornea will even for short periods, that is, less than 24 hours, cause discomfort to the wearer as a result of the lack of oxygen at the surface of the cornea. The use of a polysiloxane monomer containing vinyl unsaturation as the hydrophobic monomer in this invention provides an effective means to increase the oxygen permeability of the resulting copolymer and, hence, the lens produced therefrom. Siloxane monomers containing an acroyl group are particularly effective in providing the desired oxygen permeability.

Hydrophobic acryloxyalkylpolysiloxanes suitable for use in this invention have the general formula:

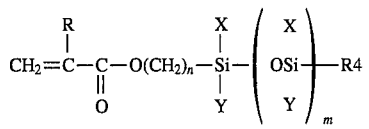

Wherein R is H or a hydrocarbon radical having from one to seven carbon atoms; X is a hydrocarbon radical having from one to seven carbon atoms or Z; Y is a hydrocarbon radical having from one to seven carbon atoms or Z;

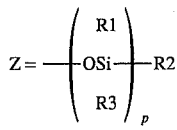

R1 is a hydrocarbon radical having from one to seven carbon atoms;

R2 is a hydrocarbon radical having from one to seven carbon atoms;

R3 is a hydrocarbon radical having from one to seven carbon atoms;

R4 is OH or a hydrocarbon radical having from one to seven carbon atoms;

m=0–3; n=1–5; and p=1–3.

Representative acryloxyalkylpolysiloxanes include γ-methacryloxypropyl-tris-trimethylsiloxysilane; α-acryloxymethyl tris(trimethylsiloxy)silane; γ-methacryloxypropyl-1,1,1-trimethyl-3,3,5,5-tetrakis(trimethylsiloxy)trisiloxane; γ-acryloxypropyl-tris(trimethylsiloxy)silane; bis(trimethylsiloxy)-γ-methacryloxypropylsilanol, methyl(trimethylsiloxy)acryloxyomethylsilanol, and (trimethylsiloxy)-(pentamethyldisiloxynyl)-γ-methacryloxypropylsilanol. The inclusion of from 0% (W/W) up to about 70% (W/W) and preferably about 0% to about 60% (W/W) of the acryloxyalkylpolysiloxanes in the comonomer mixture is used when it is desired to obtain copolymers having a very high oxygen permeability. The inclusion of from about 1% up to about 15% (W/W) of the total comonomer composition of an acryloxyalkylsilanol of the type shown above results in copolymers having increased dimensional stability. Preferred acryloxyalkylsilanes include γ-methacryloxypropyl-tris(trimethylsiloxy)silane; and γ-methacryloxypropyl-bis(trimethylsiloxy)silanol. In general the inclusion of from 0% to about 60% (W/W) of the acryloxyalkylpolysiloxanes is preferred. For hard lens compositons, the inclusion of from about 10% up to about 50% of an acryloxyalkylpolysiloxane in Mixture A and from 0% up to about 15% of an acryloxyalkylpolysiloxane in Mixture B is preferred.

Other hydrophobic vinyl monomers which readily copolymerize with methyl methacrylate can be used as part of the comonomer mixture in amounts from 0% to about 80%, and preferably up to about 30% of the total comonomer mixture. These include styrene; α-methylstyrene; pentafluorostyrene; acrylonitrile; methacrylonitrile; diethyl itaconate and 4-methyl-1-pentene. The monomers preferably have a molecular weight of less than 300.

Polymerizable monomeric polyvinyl monomers capable of acting as crosslinking agents in free radical vinyl polymerization are essential in order to obtain the novel interpenetrating network copolymers of this invention. In general from about 0.05% up to about 35% (W/W) and preferably from about 0.1% up to about 25% (W/W) of crosslinker, based on the total comonomer compositions, is used. With certain compositions, particularly good results are obtained with from about 1% up to about 25% (W/W) of crosslinkers. Suitable crosslinkers include polyol polyacrylates such as ethylene glycol dimethacrylate; glycerol trimethacrylate 1,4 bis-methacroyloxymethylcyclohexane; resorcinol dimethacrylate; and tetraethylene glycoldimethacrylate; decaethyleneglycol dimethacrylate; and alkylene bis(acrylamides) such as N,N'-methylene bis(acrylamide); N,N'-1,10-decamethylene-bis(methacrylamide); divinyl aromatic compounds such as divinylbenzene and ring substituted divinylbenzenes; allylic esters such as allyl acrylates; and bis(acryloxyalkyl)polysiloxanes having the general formula:

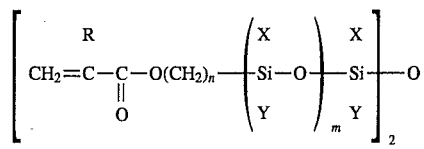

Wherein R is H or a hydrocarbon radical having from one to seven carbon atoms; X is Z or a hydrocarbon radical having from one to seven carbon atoms; Y is Z or a hydrocarbon radical having from one to seven carbon atoms;

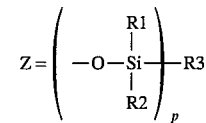

R1 is a hydrocarbon radical having from one to seven carbon atoms;

R2 is a hydrocarbon radical having from one to seven carbon atoms;

R3 is a hydrocarbon radical having from one to seven carbon atoms;

m=0–3; n=1–5; and p=1–3.

Crosslinking agents having at least ten atoms separating the vinyl groups (herein referred to as "long chain crosslinkers") are particularly effective in comonomer Mixture A and permit ready control of the crosslinking reaction and lead to clear, stable, durable copolymer products. Of these crosslinking agents polyacrylates such as diethylene glycol dimethacrylate and tetraethylene glycol dimethacrylate; and bis(acroyloxyalkyl)polysiloxanes such as 1,3-bis(methacroyloxypropyl) 1,1,3,3-tetrakis(trimethylsiloxy)disiloxane and 1,3-bis(methacryloxymethyl)1,1,3,3-tetrakis (trimethylsiloxy)disiloxane give especially good results and are preferred. In view of the additional oxygen permeability provided by the incorporation of the bis(acryloxyalkyl)polysiloxanes in the copolymer structure, their use is particularly preferred. In general, the amount of crosslinker having at least ten atoms in the chain separating the vinyl groups in Mixture A will range from about 0.1% up to about 25% (W/W) and preferably from about 0.2% up to about 15% (W/W) of the total comonomers used. Minor amounts of crosslinking agents with eight or less atoms between the vinyl groups (herein called "short chain crosslinkers") can optionally be included in comonomer Mixture A with certain formulations.

In comonomer Mixture B, it is desirable to include as a crosslinking agent a monomer in which the vinyl groups are separated by no more than eight atoms in order to increase the dimensional stability of the interpenetrating network copolymer. Polyol polyacrylates of this type, such as ethylene glycol dimethacrylate and propylene glycol dimethacrylate are particularly effective and are preferred in amounts ranging from about 0.05% up to about 12% (W/W) of total comonomers used. The incorporation in comonomer Mixture B of an additional crosslinking agent having ten or more atoms between the vinyl groups is also desirable in certain instances. Of them, polyol polyacrylates and bis(acryloxyalkyl)disiloxanes are particularly effective and are preferred.

In preparing hard lens compositions, Mixture A will contain from about 0.5 to about 25% (W/W), preferably from about 1.0 up to about 15%, of a crosslinker having at least ten atoms in the chain separating the terminal vinyl groups. For hard lens compositions, from about 1% up to about 25% (W/W) and preferably from 2% up to about 15% of crosslinker, (W/W) based on total amount of comonomers, are used in comonomer Mixture B. Particularly good results are obtained when from about 3% up to about 12% of crosslinker is used and this range is preferred for hard lens formulations. Superior results are obtained when from about 3% up to about 8% of crosslinkers having the vinyl groups separated by a chain containing no more than about 8 atoms is mixed with 0% up to 9% (W/W) of a crosslinker having at least about 10 atoms in the chain separating the vinyl groups.

For soft lens compositions the use in Mixture B from about 0.05% to about 4.0% (W/W) and especially from about 0.1% to about 2% (W/W) of crosslinking agents having the vinyl groups separated by a chain containing eight or less atoms such as ethylene glycol dimethacrylate in Mixture B gives particularly good results and is preferred. More than about 4% of the shorter chained crosslinking agents in soft lens compositions leads to an undesirable loss of cohesiveness and much less than about 0.05% results in unstable contact lenses.

In the preparation of the novel copolymers of this invention, it is essential that the copolymerization of the comonomer Mixture A be carefully monitored so that the relative viscosity of the partially polymerized system is controlled between carefully defined limits. The relative viscosity is defined as the viscosity of the partially polymerized Mixture A divided by the viscosity of the initial Mixture A just before it is purged with nitrogen.

In general, in order to obtain satisfactory results, the relative viscosity of the partially polymerized Mixture A is normally kept between from about 1.15 up to about 7.5 and preferably between about 1.25 and about 5.0. The preferred range of the relative viscosity will vary with the particular comonomer composition of Mixture A and is readily determined experimentally. For most comonomer systems best results are obtained when the relative viscosity range is from about 1.35 up to about 3.50 and this range is preferred. By maintaining the relative viscosity of the particular comonomer mixture in partially polymerized Mixture A within the desired range, it is possible to obtain copolymers having the highly reproducible properties which are required to insure close quality control of the physical properties of the final molded product.

In the preparation of the partially polymerized Mixture A, the temperature will be maintained in the general range of from about 20° C. up to about 70° C. and, preferably, between about 25° C. and about 60° C. The temperature selected will depend upon the particular comonomer composition and the amount of the vinyl polymerization initiator used. Best results are obtained at a temperature in the range of from about 30° C. up to about 40° C. using a polymerization initiator having a half life comparable to that of 2,2'-azobis(isobutryonitrile) (AIBN), the preferred initiator.

Only a controlled small fraction of the comonomers in Mixture A is converted to copolymers having a specific characteristic polymer network. By interrupting the copolymerization of Mixture A at a carefully selected time, as indicated above, determined by the relative viscosity measurement, it is possible to arrest the polymerization of Mixture A by the addition of the inhibited comonomers of Mixture B to the partially polymerized Mixture A. The low viscosity of the resulting mobile solution greatly facilitates the metering out of the combined partially polymerized Mixture A and Mixture B into the mold. The mold is then closed and the polymerization is completed in an oven or under the influence of other uniform and controllable heat sources.

Materials such as glass, stainless steel and organic polymers commonly employed for preparing molds for casting organic monomers can be used in this invention. Molds comprised of organic polymers such as poly(ethylene terephtalate), polyethylene, polypropylene, polyamides, aromatic polycarbonates, polyoxymethylene and various organic copolymers and polymers blends are suitable mold materials. The particular choice of polymer for the mold will depend upon the specific comonomer mixture being employed.

If the partial polymerization reaction in Mixture A is stopped prematurely at a relative viscosity below about 1.05, there will be undesirable shrinkage and lenses made from the blank resulting therefrom will not have the required dimensional stability for a satisfactory contact lens. If, on the other hand, the partial polymerization reaction in Mixture A is permitted to progress too far, that is, to reach a relative viscosity of more than about 8 to 10, the resulting mixture of Mixture A and Mixture B will be very difficult to dispense properly and a dimensionally unstable contact lens will result.

The systems of the present invention when practiced within the parameters specified herein, will permit the completion of the major part of the copolymerization within a carefully prescribed interpenetrating polymer network, which enables the novel copolymers of this invention to be synthesized. If the components of Mixture A and Mixture B are mixed together without the specified prior partial polymerization of Mixture A and then added to a mold and the mold is closed and the polymerization effected, excessive shrinkage will occur and the resulting molded product is unsuitable for use in the manufacture of contact lenses. On the other hand, the practice of the copolymerization in accordance with this teaching enables a novel copolymer structure to be obtained within the confines of an interpenetrating copolymer network.

This invention makes possible the preparation of high quality contact lenses by a novel, simple, economical cast molding process which avoids difficulties encountered in prior art procedures. Further, the present invention requires far less monomer per lens than the conventional procedure in which buttons are cut from cast rods. Much less time is required to prepare a finished lens from the lens blank produced in accordance herewith because much less extraneous copolymer has to be removed from the lens blank by a lathing process to obtain a fittable contact lens. This further benefits the manufacturer by creating much less wear on the diamond cutting tool per lens fabricated.

The two stage process is readily controllable and yields contact lens blanks having outstanding physical properties. The controlled partial polymerization of Mixture A results in a soluble copolymer network system which substantially eliminates any significant loss of monomer. This is particularly important with relatively volatile monomers such as methyl methacrylate. The novel polymer network in Mixture A also results in a reduced penetration of monomer in any plastic mold used. Further, the process enables casting solution to be prepared in large quantities and stored until needed.

The two stage process provides a high degree of uniformity in any given copolymer composition by providing control over both the initial copolymer formation in Mixture A and subsequent completion of the final polymerization after the partially polymerized Mixture A and Mixture B are combined. The use of very small quantities of the combined partially polymerized Mixture A and Mixture B in molding in the present invention makes possible the preparation of contact lens blanks which are more homogeneous and accordingly have less strain than is found in contact lenses cut from buttons by conventional procedures. The diamond cutting of contact lens blanks creates elevated temperatures which can result in undesirable surface effects. In the practice of the present invention, lens cutting is reduced to a minimum, with resultant improved surface characteristics.

To better aid in the understanding of the present invention and not by way of limitation the following examples are presented.

EXAMPLE 1

A mixture (A) was prepared by mixing together in a glass container 42 parts of methyl methacrylate; 25 parts of α-methacryloxypropyl-tris(trimethysiloxy)silane; 5 parts of bis(trimethylsiloxy)methacryloxypropylsilanol; 4 parts of 1,3-bis(methacryloxypropyl)-1,1,3,3-tetrakis(trimethylsiloxy)disiloxane; 7 parts of methacrylic acid; and 0.8 part of 2,2'-azobis(isobutryonitrile). Mixture A was gradually warmed to a temperature of 35° C. and then purged with a stream of dry nitrogen gas. The viscosity was measured at regular intervals relative to the viscosity of the initial Mixture A before purging. The polymerization was permitted to proceed until a relative viscosity of 1.40 was reached. At that point inhibited Mixture B, which contained 8 parts of methyl methacrylate; 5 parts of γ-methacryloxypropyl-tris(trimethylsiloxy)silane; 5 parts of ethylene glycol dimethacrylate; and 1 part of 1,1,3,3-tetrakis(trimethylsiloxy)disiloxane, was added to the partially polymerized Mixture A in the presence of air to halt the polymerization thereof. The resulting mixture was thereafter at room temperature added to plastic molds which were designed to provide a contact lens blank having a finished concave surface. The filled molds were put in trays which were placed in a forced draft oven in a nitrogen atmosphere. The oven temperature was raised slowly over a period of several hours to a temperature of about 70° C. and maintained at that temperature for 10 hours. Thereafter, the trays were removed from the oven and cooled. The contact lens blanks were then removed and the unfinished surface of the blanks was lathe cut to the desired dimension and polished to provide an optical surface. The resulting contact lenses possessed excellent optical properties and were durable, readily wettable and resistant to warpage and surface deposits. The Dk was $17 \times 10^{-11}$, where $Dk = (y)10^{-11}$ $(cm^2/sec)ml\ O_2 \times ml \times mmHg)$ at 35° C. to 37° C.

EXAMPLES 2–13

Contact lenses were prepared in accordance with the procedure of Example 1. The lenses so produced are suitable for daily or extended wear, depending upon the specific application for which they were fabricated. Each has the desired combination of optical properties including optical clarity, durability, oxygen permeability, mechanical strength, wettability, and resistance to surface deposits. The comonomers used to prepare the copolymers present in Mixture A and Mixture B for each of the Examples are shown in Table A below in the parts by weight.

TABLE A

| Monomer | Mixture | | | | | | | |
|---|---|---|---|---|---|---|---|---|
| | A | B | A | B | A | B | A | B |
| | Example | | | | | | | |
| | 2 | | 3 | | 4 | | 5 | |
| MMA | 18 | 5 | 9 | 1 | 24 | 5 | 5 | 1 |
| 3-FMA | — | — | 23 | 3 | — | — | 12 | 2 |
| MAPS | 42 | 3 | 35 | 4 | 37 | 4 | 46 | 3 |
| SiOH | 7 | 1 | 5 | 1 | 5 | 1 | 7 | 1 |
| BMPS | 5 | 2 | 4 | 1 | 5 | 1 | 6 | 1 |
| EGDM | — | 7 | — | 5 | — | 7 | — | 7 |
| TEDM | — | — | — | — | — | — | — | — |
| MAA | 9 | — | 8 | — | 9 | — | 9 | — |
| NVP | 1 | — | 1 | — | — | 2 | — | — |
| HEMA | — | — | — | — | — | — | — | — |
| STY | — | — | — | — | — | — | — | — |
| AIBN | 1.0 | — | 1.0 | — | 0.9 | — | 1.0 | — |
| RVA | 2.41 | — | 3.33 | — | 2.25 | — | 1.56 | — |
| $Dk \times 10^{-11}$ | 56 | | 66 | | 46 | | 106 | |

| Monomer | Example | | | | | | | |
|---|---|---|---|---|---|---|---|---|
| | 6 | | 7 | | 8 | | 9 | |
| | A | B | A | B | A | B | A | B |
| MMA | 22 | 3 | 17 | 6 | 27 | 23 | 3 | 3 |
| 3-FMA | 12 | 2 | — | — | — | — | — | — |
| MAPS | 35 | 2 | 38 | 7 | 16 | 14 | 15 | 1.5 |
| SiOH | 4 | 1 | 6 | 2 | 2 | 2 | 1.5 | 0.3 |
| BMPS | 4 | 1 | 5 | 2 | 2 | 2 | 1.5 | 0.2 |
| EGDM | — | 5 | — | 7 | — | 6 | — | 2 |
| TEDM | — | — | — | — | — | — | — | — |
| MAA | 8 | — | 9 | — | 6 | — | — | — |
| NVP | 1 | — | 1 | — | — | — | 59 | 6.5 |
| HEMA | — | — | — | — | — | — | 6 | 0.5 |
| STY | — | — | — | — | — | — | — | — |
| AIBN | 0.8 | — | 0.9 | 0.1 | 0.8 | — | 1.0 | — |
| RVA | 1.94 | — | 1.35 | — | 2.44 | — | 1.74 | — |
| $Dk \times 10^{-11}$ | 40 | | 56 | | 17 | | 20 | |

| Monomer | Example | | | | | | | |
|---|---|---|---|---|---|---|---|---|
| | 10 | | 11 | | 12 | | 13 | |
| | A | B | A | B | A | B | A | B |
| MMA | 20 | 3 | 18 | 2 | — | — | — | — |
| 3-FMA | — | — | — | — | — | — | — | — |
| MAPS | 50 | 5 | 44 | 5 | 2 | — | — | — |
| SiOH | — | — | 5.5 | 0.5 | 0.3 | — | — | — |
| BMPS | — | — | 5.5 | 0.5 | 0.2 | — | — | — |
| EGDM | — | 7 | — | 7 | — | 0.5 | — | 0.5 |
| TEDM | 5.5 | 0.5 | — | — | — | — | 2.5 | — |
| MAA | 9 | — | 9 | — | — | — | — | — |
| NVP | — | 1 | — | 1 | 8 | 1 | 8 | 1 |
| HEMA | — | — | — | — | 75 | 13 | 75 | 13 |
| STY | — | — | 2 | — | — | — | — | — |
| AIBN | 1.0 | — | 1.0 | — | 0.75 | — | 0.75 | — |
| RVA | 2.20 | — | 3.11 | — | 8.60 | — | 2.37 | — |
| $Dk \times 10^{-11}$ | 55 | | 51 | | 9 | | 7 | |

LEGEND

| | |
|---|---|
| MMA | methyl methacrylate |
| 3-FMA | 2,2,2-trifluoroethyl methacrylate |
| MAPS | methacryloxypropyl-tris(trimethylsiloxy)silane |
| SiOH | bis(trimethylsiloxy)-γ-methacryloxypropylsilanol |
| BMPS | 1,3-bis(methacryloxypropyl)-1,1,3,3-tetrakis(trimethylsiloxy)disiloxane |
| EGDM | ethylene glycol dimethacrylate |
| TEDM | tetraethylene glycol dimethacrylate |
| MAA | methacrylic acid |

TABLE A-continued

|  | Mixture | | | | | | | |
|---|---|---|---|---|---|---|---|---|
| Monomer | A | B | A | B | A | B | A | B |

NVP     N-vinyl-2-pyrrolidone
HEMA   2-hydroxyethyl methacrylate
STY     styrene
AIBN    2,2-azo-bis(isobutyronitrile)
RVA     relative viscosity of partially polymerized Mixture A
Dk       $(y)10^{-11}$ ($cm^2$/sec ml $O_2$ × ml × mmHg) at 35° C.–37° C.

From the foregoing, it becomes apparent that new and useful procedures have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly, what is claimed is:

1. A method of producing an optical lens blank having an interpenetrating network copolymer composition, said method comprising: preparing, in weight percent of the weight of all polymerizable vinyl monomers in the network copolymer composition (W/W), a first mixture of polymerizable vinyl monomers containing from about 5% to about 95% (W/W) of polymerizable vinyl monomers, from about 0.01% up to about 35% of a polymerizable monomeric vinyl crosslinking agent, and from about 0.1% up to about 3% (W/W) of a vinyl polymerization initiator; preparing a second mixture of polymerizable vinyl monomers containing from about 5% up to about 95% (W/W) of polymerizable vinyl monomers, from about 0.1% up to about 25% of a polymerizable monomeric vinyl crosslinking agent, and from about 0% up to about 0.3% (W/W) of a vinyl polymerization initiator; polymerizing said first mixture until said partially polymerized first mixture obtains a relative viscosity relative to said unpolymerized first mixture of from about 1.05 up to about 10; interrupting the polymerization of said partially polymerized first mixture by mixing said second mixture therein to create a casting solution therewith; introducing said casting solution into a mold having at least one lens finishing surface therein; closing said molds; heating said closed mold in the range of from about 20° C. up to about 70° C. for a time sufficient to complete the polymerization of said casting solution and create a lens blank having at least one optical surface in said mold; removing the closed mold from an oven; and removing said blank from said mold.

2. A method of producing an optical lens blank according to claim 1 in which said first mixture contains from about 40% up to about 95% (W/W) of said polymerizable vinyl monomers.

3. A method of producing an optical lens blank according to claim 1 in which said second mixture contains from about 40% up to about 95% (W/W) of said polymerizable vinyl monomers.

4. A method of producing an optical lens blank according to claim 2 in which said second mixture contains from about 40% up to about 95% (W/W) of said polymerizable vinyl monomers.

5. A method of producing an optical lens blank according to claim 1 in which said first mixture contains from about 0.1% up to about 25% of a polymerizable monomeric vinyl crosslinking agent.

6. A method of producing an optical lens blank according to claim 1 in which said relative viscosity is between 1.15 and 7.5.

7. A method of producing an optical lens blank according to claim 1 in which said relative viscosity is between 1.25 and 5.0.

8. A method of producing an optical lens blank according to claim 1 in which said polymerizable vinyl monomers comprise 0% up to about 85% (W/W) hydrophobic polymerizable vinyl monomers, from about 1% up to about 98% (W/W) polymerizable hydrophilic vinyl monomers, and from about 0.1% up to about 35% (W/W) of a polymerizable monomeric vinyl crosslinking agent, and from about 0.1% up to about 3.0% of a vinyl polymerization initiator.

9. A method of producing an optical lens blank according to claim 2 in which said polymerizable vinyl monomers comprise 0% up to about 85% (W/W) hydrophobic polymerizable vinyl monomers, from about 1% up to about 98% (W/W) polymerizable hydrophilic vinyl monomers, from about 0.1% up to about 35% (W/W) of a polymerizable monomeric vinyl crosslinking agent, and from about 0.1% up to about 3.0% of a vinyl polymerization initiator.

10. A method of producing an optical lens blank according to claim 3 in which said polymerizable vinyl monomers comprise 0% up to about 85% (W/W) hydrophobic polymerizable vinyl monomers, from about 1% up to about 98% (W/W) polymerizable hydrophilic vinyl monomers, from about 0.1% up to about 35% (W/W) of a polymerizable monomeric vinyl crosslinking agent, and from about 0.1% up to about 3.0% of a vinyl polymerization initiator.

11. A method of producing an optical lens blank according to claim 4 in which said polymerizable vinyl monomers comprise 0% up to about 85% (W/W) hydrophobic polymerizable vinyl monomers, from about 1% up to about 98% (W/W) polymerizable hydrophilic vinyl monomers, from about 0.1% up to about 35% (W/W) of a polymerizable monomeric vinyl crosslinking agent, and from about 0.1% up to about 3.0% of a vinyl polymerization initiator.

12. A method of producing an optical lens blank according to claim 5 in which said polymerizable vinyl monomers comprise 0% up to about 85% (W/W) hydrophobic polymerizable vinyl monomers, from about 1% up to about 98% (W/W) polymerizable hydrophilic vinyl monomers, from about 0.05% up to about 35% (W/W) of a polymerizable monomeric vinyl crosslinking agent, and from about 0.1% up to about 3.0% of a vinyl polymerization initiator.

13. A method of producing an optical lens blank according to claim 6 in which said polymerizable vinyl monomers comprise 0% up to about 85% (W/W) hydrophobic polymerizable vinyl monomers, from about 1% up to about 98% (W/W) polymerizable hydrophilic vinyl monomers, from about 0.05% up to about 35% (W/W) of a polymerizable monomeric vinyl crosslinking agent, and from about 0.1% up to about 3.0% of a vinyl polymerization initiator.

14. A method of producing an optical lens blank according to claim 1 in which said polymerizable vinyl monomers comprise from 0% up to about 85% (W/W) of hydrophobic polymerizable vinyl monomers, from 0% up to about 90% (W/W) of hydrophilic polymerizable vinyl monomers, from about 0.1% up to about 25% (W/W) of a polymerizable monomeric vinyl crosslinking agent, and from about 0.1% up to about 3.0% of a vinyl polymerization initiator.

15. A method of producing an optical lens blank according to claim 5 in which said polymerizable vinyl monomers comprise from 0% up to about 85% (W/W) of hydrophobic polymerizable vinyl monomers, from 0% up to about 90% (W/W) of hydrophilic polymerizable vinyl monomers, and from about 0.1% up to about 25% (W/W) of a polymerizable monomeric vinyl crosslinking agent, and from about 0.1% up to about 3.0% of a vinyl polymerization initiator.

16. A method of producing an optical lens blank according to claim 12 in which said polymerizable vinyl monomers comprise from 0% up to about 85% (W/W) of hydrophobic polymerizable vinyl monomers, from 0% up to about 90% (W/W) of hydrophilic polymerizable vinyl monomers, and from about 0.1% up to about 25% (W/W) of a polymerizable monomeric vinyl crosslinking agent, and from about 0.1% up to about 3.0% of a vinyl polymerization initiator.

17. A method of producing an optical lens blank according to claim 1 in which said first mixture contains from 0% up to about 85% (W/W) of hydrophobic monomers, from 0% up to about 90% (W/W) of hydrophilic monomers, from about 1% up to about 20% (W/W) of a polymerizable monomeric vinyl crosslinking agent; and from about 0.1% up to about 3.0% (W/W) of a vinyl polymerization initiator and said partially polymerized first mixture obtains a relative viscosity of from about 1.25 up to about 5.0.

18. A method of producing an optical lens blank according to claim 1 in which said second mixture contains from 0% up to about 45% (W/W) of hydrophobic monomers, from 0% up to about 45% (W/W) of hydrophilic monomer, from about 2% up to about 15% (W/W) of a polymerizable monomeric crosslinking agent.

19. A method of producing an optical lens blank according to claim 17 in which said second mixture contains from 0% up to about 45% (W/W) of hydrophobic monomers, from 0% up to about 45% (W/W) of hydrophilic monomer, from about 2% up to about 15% (W/W) of a polymerizable monomeric crosslinking agent.

20. A method of producing a contact lens according to claim 1 comprising machining said lens blanks to conform to a preselected prescription.

21. The method of fitting a contact lens to a patient having a known prescription comprising preparing an optical lens blank according to the method of claim 1; machining the lens blank to remove all extraneous materials therefrom; finishing the remaining solid lens material into a finished contact lens conforming to said known prescription; and fitting the finished contact lens to the patient to whom said prescription pertains.

* * * * *